(12) United States Patent
Gagne et al.

(10) Patent No.: US 10,982,730 B2
(45) Date of Patent: Apr. 20, 2021

(54) FLYWHEEL SYSTEMS AND RELATED METHODS

(71) Applicant: Saint-Augustin Canada Electric Inc., Saint-Augustin de Desmaures (CA)

(72) Inventors: Christian Gagne, Saint-Augustin (CA); Sebastien Arcand, Saint-Augustin (CA); Nicolas Doyon, Saint-Augustin (CA)

(73) Assignee: Saint- Augustin Canada Electric Inc., Saint-Augustin (CA)

( * ) Notice: Subject to any disclaimer, the term of this patent is extended or adjusted under 35 U.S.C. 154(b) by 40 days.

(21) Appl. No.: 16/291,895

(22) Filed: Mar. 4, 2019

(65) Prior Publication Data

US 2020/0284317 A1 Sep. 10, 2020

(51) Int. Cl.
*F16F 15/315* (2006.01)
*F03G 3/08* (2006.01)

(52) U.S. Cl.
CPC ............ *F16F 15/3156* (2013.01); *F03G 3/08* (2013.01)

(58) Field of Classification Search
CPC ...... F16F 15/30; F16F 15/315; F16F 15/3156; F16C 2361/55
See application file for complete search history.

(56) References Cited

U.S. PATENT DOCUMENTS

| | | | |
|---|---|---|---|
| 3,436,572 A | 4/1969 | Storsand | |
| 4,977,794 A * | 12/1990 | Metcalf | A63B 21/225 482/63 |
| 5,614,777 A | 3/1997 | Bitterly et al. | |
| 5,635,770 A | 6/1997 | Evans et al. | |
| 6,049,150 A * | 4/2000 | Chudleigh, Jr. | F16F 15/30 310/178 |
| 6,219,623 B1 | 4/2001 | Wills | |

(Continued)

FOREIGN PATENT DOCUMENTS

| | | |
|---|---|---|
| CN | 105811646 A | 7/2016 |
| DE | 2754623 A1 | 6/1979 |
| WO | 2016/210176 A1 | 12/2016 |

OTHER PUBLICATIONS

Murphy et al., "Turbogenerator flywheel for Alcator C-MOD," Proceedings the 14th IEEE/NPSS Symposium Fusion Engineering, (1991), pp. 551-554.

(Continued)

*Primary Examiner* — Patrick Cicchino
(74) *Attorney, Agent, or Firm* — TraskBritt

(57) ABSTRACT

A flywheel system comprises a flywheel rotor comprising a rotor disc and a rotor shaft and has a longitudinal axis extending centrally through the rotor disc and the rotor shaft. The system further comprises a journal assembly configured to facilitate rotation of the flywheel rotor. The journal assembly comprises a sleeve having an aperture extending therethrough from a first end to a second, opposite end, a rod at least partially disposed within the aperture of the sleeve, and a nut coupled to a portion of the rod. The rod has a length greater than the sleeve such that a portion of the rod extends axially beyond the first end of the sleeve. A method of forming the flywheel comprises coupling the rod to the rotor shaft and pulling the second end of the rod to tension the rod. The nut maintains the tension in the rod when coupled thereto.

19 Claims, 6 Drawing Sheets

(56) References Cited

U.S. PATENT DOCUMENTS

| | | |
|---|---|---|
| 6,262,505 B1 | 7/2001 | Hockney et al. |
| 6,347,925 B1 | 2/2002 | Woodard et al. |
| 6,491,441 B2 | 12/2002 | Vignotto et al. |
| 6,585,490 B1 | 7/2003 | Gabrys et al. |
| 6,609,674 B2 | 8/2003 | Gabrys |
| 6,614,132 B2 | 9/2003 | Hockney et al. |
| 6,617,733 B1 | 9/2003 | Yamauchi et al. |
| 6,630,761 B1 | 10/2003 | Gabrys |
| 6,644,834 B2 | 11/2003 | Christen |
| 6,675,872 B2 | 1/2004 | Lewis et al. |
| 6,707,187 B1 | 3/2004 | Gabrys |
| 6,710,489 B1 | 3/2004 | Gabrys |
| 6,727,616 B1 | 4/2004 | Gabrys et al. |
| 6,741,007 B2 | 5/2004 | Frash et al. |
| 6,747,378 B2 | 6/2004 | Brackett |
| 6,810,339 B2 | 10/2004 | Wills |
| 6,817,266 B1 | 11/2004 | Brackett |
| 6,824,861 B2 | 11/2004 | Spears |
| 6,825,588 B2 | 11/2004 | Gabrys et al. |
| 6,852,401 B2 | 2/2005 | Spears et al. |
| 6,882,072 B2 * | 4/2005 | Wingett ............... F16F 15/315 310/71 |
| 6,884,039 B2 | 4/2005 | Woodard et al. |
| 6,921,998 B2 * | 7/2005 | Giles ...................... H02K 7/025 310/74 |
| 6,959,756 B2 | 11/2005 | Woodard et al. |
| 7,034,420 B2 | 4/2006 | Brackett et al. |
| 7,080,573 B2 | 7/2006 | Detore et al. |
| 7,174,806 B2 | 2/2007 | Brackett et al. |
| 7,223,020 B2 | 5/2007 | Bauer et al. |
| 7,240,583 B2 * | 7/2007 | Wingett ............... F16C 27/066 74/573.13 |
| 7,267,028 B2 | 9/2007 | Gabrys |
| 7,365,461 B2 | 4/2008 | Brackett et al. |
| 7,608,951 B2 * | 10/2009 | Potter .................... B64G 1/283 310/74 |
| 7,679,245 B2 | 3/2010 | Brackett et al. |
| 7,679,247 B2 | 3/2010 | Wang |
| 7,750,518 B1 | 7/2010 | Perkins |
| 7,830,055 B2 | 11/2010 | Arseneaux et al. |
| 7,834,479 B2 | 11/2010 | Capp et al. |
| 8,008,804 B2 | 8/2011 | Capp et al. |
| 8,102,144 B2 | 1/2012 | Capp et al. |
| 8,179,009 B2 | 5/2012 | Saban |
| 8,234,953 B2 | 8/2012 | Hilton et al. |
| 8,237,320 B2 | 8/2012 | Saban et al. |
| 8,247,938 B2 | 8/2012 | Saban et al. |
| 8,310,123 B2 | 11/2012 | Saban et al. |
| 8,314,527 B2 | 11/2012 | Wang |
| 8,368,271 B2 | 2/2013 | Wiggins |
| 8,471,421 B2 | 6/2013 | McCulley |
| 8,482,174 B2 | 7/2013 | Filatov |
| 8,584,552 B2 | 11/2013 | Gottfried |
| 8,669,675 B2 | 3/2014 | Capp et al. |
| 8,776,635 B2 | 7/2014 | Morgan et al. |
| 8,791,613 B2 | 7/2014 | Wang |
| 8,957,641 B1 | 2/2015 | Hsu |
| 9,065,295 B2 | 6/2015 | Capp et al. |
| 9,077,211 B2 | 7/2015 | Kalev |
| 9,083,207 B1 | 7/2015 | Veltri et al. |
| 9,140,297 B2 | 9/2015 | Hashish et al. |
| 9,148,037 B2 | 9/2015 | Kalev et al. |
| 9,267,570 B2 | 2/2016 | Spears et al. |
| 9,273,755 B2 | 3/2016 | Atkins |
| 9,279,474 B2 | 3/2016 | Tarrant |
| 9,325,217 B2 | 4/2016 | Veltri |
| 9,360,082 B2 | 6/2016 | Hilton et al. |
| 9,362,800 B2 | 6/2016 | Chiao et al. |
| 9,362,801 B2 | 6/2016 | Veltri et al. |
| 9,438,035 B2 | 9/2016 | Capp et al. |
| 9,464,685 B2 | 10/2016 | Christensen et al. |
| 9,515,531 B2 | 12/2016 | Jansen et al. |
| 9,534,658 B1 | 1/2017 | Rivas et al. |
| 9,667,117 B2 | 5/2017 | Ben et al. |
| 9,718,343 B2 | 8/2017 | Atkins et al. |
| 9,729,025 B2 | 8/2017 | Hull et al. |
| 9,752,558 B2 | 9/2017 | Lee et al. |
| 9,759,195 B2 | 9/2017 | Park et al. |
| 9,787,156 B1 | 10/2017 | Cannon |
| 9,816,583 B2 | 11/2017 | Baumer |
| 9,831,742 B2 | 11/2017 | Kalev et al. |
| 9,843,237 B2 | 12/2017 | Kalev et al. |
| 9,847,641 B2 | 12/2017 | Capp et al. |
| 9,856,941 B2 | 1/2018 | Arseneaux et al. |
| 9,887,604 B2 | 2/2018 | Bremer et al. |
| 9,892,839 B2 | 2/2018 | Sanders |
| 9,906,075 B2 | 2/2018 | Schoebrechts et al. |
| 9,909,645 B2 | 3/2018 | Tarrant et al. |
| 10,003,237 B2 | 6/2018 | Sanders et al. |
| 2002/0063368 A1 | 5/2002 | Kabir |
| 2004/0076809 A1 | 4/2004 | Spears |
| 2005/0150323 A1 | 7/2005 | Spears |
| 2006/0243259 A1 * | 11/2006 | Takahashi ................ F02C 6/12 123/559.1 |
| 2007/0014980 A1 | 1/2007 | Spears |
| 2010/0018344 A1 | 1/2010 | Spears et al. |
| 2016/0061289 A1 | 3/2016 | Sanders et al. |
| 2016/0377147 A1 | 12/2016 | Sun et al. |
| 2016/0380445 A1 | 12/2016 | He |
| 2017/0317553 A1 | 11/2017 | Bakholdin et al. |
| 2018/0003263 A1 | 1/2018 | Sanders et al. |
| 2018/0006539 A1 * | 1/2018 | Sanders .................. H02K 7/09 |
| 2018/0034344 A1 | 2/2018 | Hitchcock et al. |
| 2018/0069399 A1 | 3/2018 | Capp et al. |
| 2018/0080525 A1 | 3/2018 | Sanders et al. |
| 2018/0190418 A1 | 7/2018 | Sanders |
| 2018/0269748 A1 | 9/2018 | Sanders et al. |
| 2019/0346013 A1 | 11/2019 | Bakholdin et al. |

OTHER PUBLICATIONS

Heat Treating Processes and related Technology, Heat Treater's Guide: Practices and Procedures for Irons and Steels, 2nd Edition, (1995), 10 pages.

ASM Handbook, Volume 01: Properties and Selection: Irons, Steels, and High-Performance Alloys, ASM International, (1990), 66 pages.

International Search Report for International Application No. PCT/CA2020/050358 dated Jun. 18, 2020, 4 pages.

International Written Opinion for International Application No. PCT/CA2020/050358 dated Jun. 18, 2020, 4 pages.

* cited by examiner

FLYWHEEL SYSTEMS AND RELATED METHODS

TECHNICAL FIELD

Embodiments of the present disclosure relate to a flywheel energy storage system. More particularly, this disclosure relates to journal assemblies for supporting rotation of a flywheel rotor.

BACKGROUND

Energy can be converted from one form to another, such as from electrical energy into kinetic energy and vice versa. A flywheel is an energy system that stores energy as rotational kinetic energy. Accordingly, electrical energy may be provided to a motor that can spin a flywheel. The electrical energy may be received for storage in the flywheel. The momentum of the flywheel is a form of stored energy. The motor can also be used as a generator and convert the rotational kinetic energy of the flywheel into electrical energy. Once a flywheel has momentum, the flywheel can theoretically spin indefinitely. However, parasitic losses such as friction and drag can diminish the efficiency of a flywheel as an energy storage device. Accordingly, it can be desirable to increase the efficiency of a flywheel energy storage system. Further, friction and drag can reduce the usable life of the flywheel system. By way of example, bearings, which support the flywheel for rotation, may wear prematurely as a result of flywheel imbalances during operation.

BRIEF SUMMARY

Various embodiments of the disclosure comprise a flywheel system comprising a flywheel rotor comprising a rotor disc and a rotor shaft, the rotor having a longitudinal axis extending centrally through the rotor disc and the rotor shaft. The system further comprises a journal assembly configured to facilitate rotation of the flywheel rotor. The journal assembly comprises a sleeve having an aperture extending therethrough from a first end to an opposite second end and a longitudinal axis of the sleeve extending therethrough from the first end to the second end. The second end of the sleeve is coupled to the rotor shaft. The journal assembly further comprises a rod at least partially disposed within the aperture of the sleeve. A first end of the rod extends axially beyond the first end of the sleeve and a second end of the rod is coupled to the rotor shaft. A longitudinal axis of the rod extends therethrough from the first end to the second end wherein the longitudinal axes of the sleeve and the rod are coaxial with the longitudinal axis of the flywheel rotor. The journal assembly further comprises a retaining element coupled to the first end of the rod extending axially beyond the first end of the sleeve.

A method of using a flywheel system comprises rotating a flywheel rotor disposed between an upper journal assembly and a lower journal assembly. Each of the upper journal assembly and the lower journal assembly is coupled to the flywheel rotor and comprises a sleeve having an aperture extending therethrough from a first end to an opposite second end, a rod disposed within the aperture of the sleeve such that a portion the rod extends axially beyond the first end of the sleeve, and a retaining element coupled to the portion of the rod extending axially beyond the first end of the sleeve. The method further comprises lifting the flywheel rotor axially toward an upper bearing assembly and away from a lower bearing assembly to apply an axially compressive force against a bearing disposed within the upper bearing assembly. The upper bearing assembly is disposed about the upper journal assembly.

A method of forming a flywheel system comprises coupling a rod to a flywheel rotor shaft. The rod has a first end and an opposite end with the first end of the rod coupled to the flywheel rotor shaft. A sleeve is disposed about the rod and coupled the sleeve to the flywheel rotor shaft. The sleeve has a first end and an opposite second end. The first end of the sleeve is coupled to the flywheel rotor shaft. The second end of the rod extends axially beyond the second end of the sleeve. The method further comprises pulling the second end of the rod to tension the rod, and coupling a retaining element to the second end of the rod to maintain the tension in the rod.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of example embodiments of the disclosure when read in conjunction with the accompanying drawings, in which:

DETAILED DESCRIPTION

Figure 1:
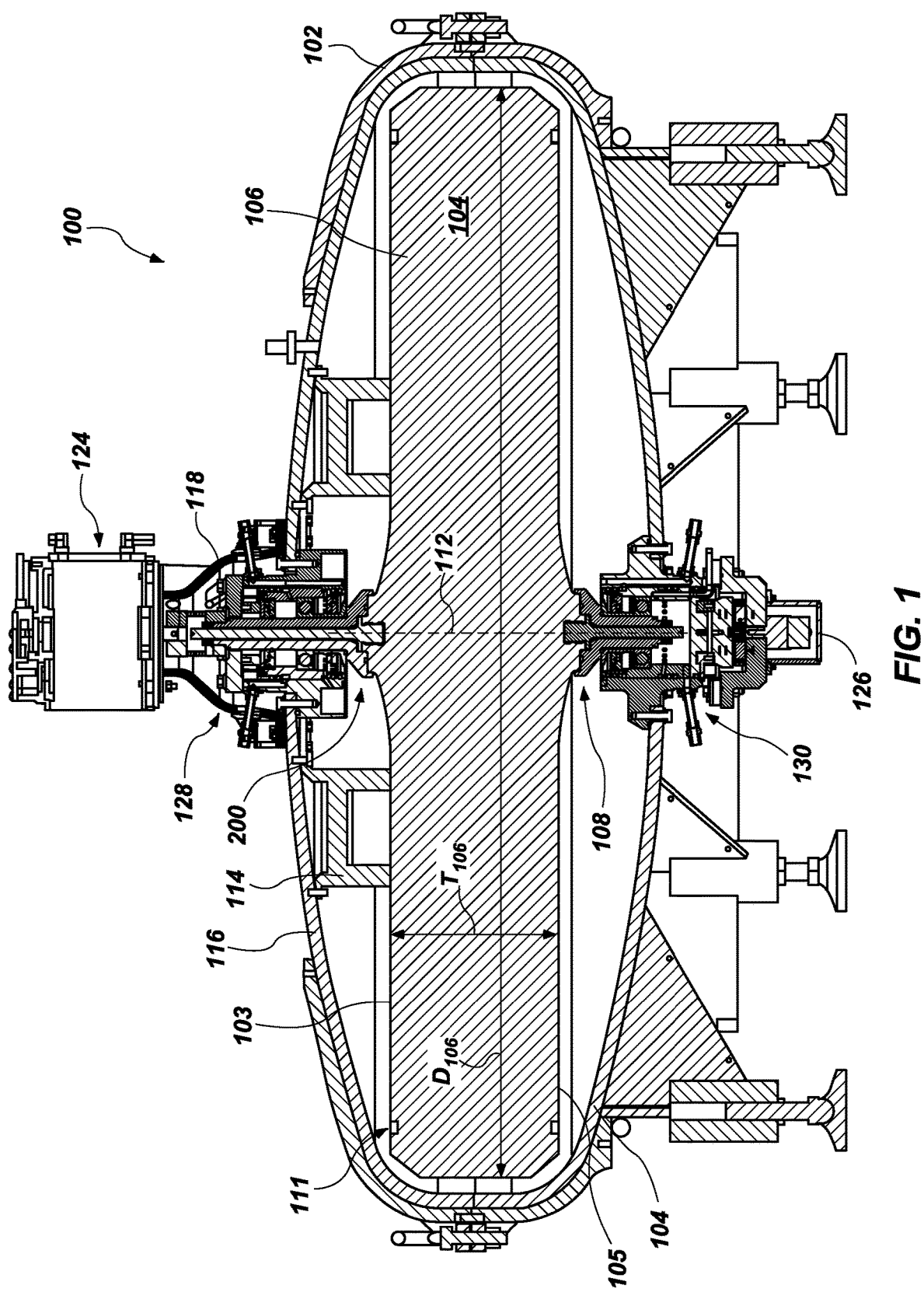
FIG. 1 is a cross-sectional view of a flywheel energy storage system.

The illustrations presented herein are not meant to be actual views of any particular component, device, or system, but are merely idealized representations that are employed to describe embodiments of the present disclosure. The following description provides specific details of embodiments of the disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, any drawings accompanying the application are for illustrative purposes only, and are thus not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as the elements and features are illustrated and oriented in the figures. Unless otherwise specified, the spatially relative terms are intended to encompass different orientations of the materials in addition to the orientation depicted in the figures.

As used herein, the terms "longitudinal," "longitudinally," "axial," or "axially" refers to a direction parallel to a rotational axis of one or more components of the flywheel energy storage system described herein including, but not limited to, the flywheel rotor described herein. For example, "longitudinal" or "axial" movement shall mean movement in a direction substantially parallel to the rotational axis of the flywheel energy storage system as described herein.

As used herein, the terms "radial" or "radially" refers to a direction transverse to a rotational axis of one or more components of the flywheel energy storage system described herein including, but not limited to, the flywheel rotor described herein. For example, "radial movement" shall mean movement in a direction substantially transverse (e.g., perpendicular) to the rotational axis of one or more components of the flywheel energy storage system as described herein.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, even at least 99.9% met, or even 100.0% met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

FIG. 1 is a cross-sectional view of a flywheel energy storage system 100. The system 100 includes a housing 102 for enclosing a flywheel rotor 104. The rotor 104 comprises a rotor disc 106 and a rotor shaft 108 having a central axis 112. The system 100 is configured such that the rotor 104 may rotate about the axis 112 in operation. Accordingly, the axis 112 may also be referred to herein as the rotational axis. The system 100 is further configured to be axially translatable along the axis 112 in operation. The rotor shaft 108 refers to a portion at and/or adjacent to a radial center of the rotor 104 and extending axially beyond the rotor disc 106. The rotor shaft 108 comprises an upper shaft 108a (FIG. 3) extending axially over an upper surface 103 of the rotor disc 106 and a lower shaft 108b (FIG. 4) extending axially over a lower surface 105 of the rotor disc 106. The upper shaft 108a and the lower shaft 108b may each comprise protruding (e.g., stepped) features 107a, 107b (FIGS. 3 and 4), respectively, for coupling the rotor 104 to an upper journal assembly 200a (FIG. 3) and a lower rotating assembly 200b (FIG. 4), respectively. In some embodiments, an interior of the housing 102 may be subject to a vacuum to reduce aerodynamic drag on the rotor 104 during operation.

The rotor 104 may be formed of a magnetic metal or metal alloy. More particularly, the rotor 104 may comprise magnetic steel. In some embodiments, the rotor 104 is formed of 4340 steel. Other suitable materials may include AISI 4330, 5330, 17-14PH (precipitation hardened), M300, and other high strength steels. In yet further embodiments, the rotor 104 may be formed of any metal or metal alloy formulated to withstand a stress of at least 140 ksi (968 MPa) at a radial and axial center of the rotor 104.

In some embodiments, the rotor shaft 108 may be integrally formed with the rotor disc 106 such that the rotor disc 106 and the rotor shaft 108 form a single, monolithic unit. In other embodiments, the upper and lower shafts 108a, 108b may be separately formed (e.g., machined) and may be fixed to the rotor disc 106 by, for example, welding. Without the upper and lower shafts 108a, 108b, the rotor disc 106 may have a substantially uniform thickness $T_{106}$ across a diameter $D_{106}$. As used herein, the term "disc" means and includes a cylindrical body having a diameter greater than a thickness. The thickness $T_{106}$ of the rotor disc 106 may be in a range extending from about 6 inches to about 18 inches, and, more particularly, may be about 12 inches (e.g., 12.2 inches). The diameter $D_{106}$ of the rotor disc 106 may be in a range extending from about 48 inches to about 96 inches and, more particularly, may be about 80 inches. A weight of the rotor 104 may be in a range extending from about 12,000 pounds to about 18,000 pounds and, more particularly, may be about 15,000 pounds or about 17,000 lbs (e.g., 17,200 lbs).

The system 100 further comprises an off-loading magnet 114 disposed within the housing 102. The off-loading magnet 114 may be coupled (e.g., fixed) to an upper housing member 116. In some embodiments, the off-loading magnet 114 may comprise an electromagnet configured to apply an axial force on the rotor 104 to attract (e.g., lift) the rotor 104 upwards toward the upper bearing assembly 128 (e.g., in the axial direction).

A first exterior housing 118 may be coupled to the upper housing member 116 on an exterior of the housing 102. A motor/generator assembly 124 may be disposed on (e.g., over) and may be coupled to the first exterior housing 118. An upper bearing assembly 128 may be disposed within the first exterior housing 118. A lower bearing assembly 130 may be coupled to a lower housing member 124 on an exterior of the housing 102. A gear drive system 126 may be coupled to the lower bearing assembly 130.

Figure 2:
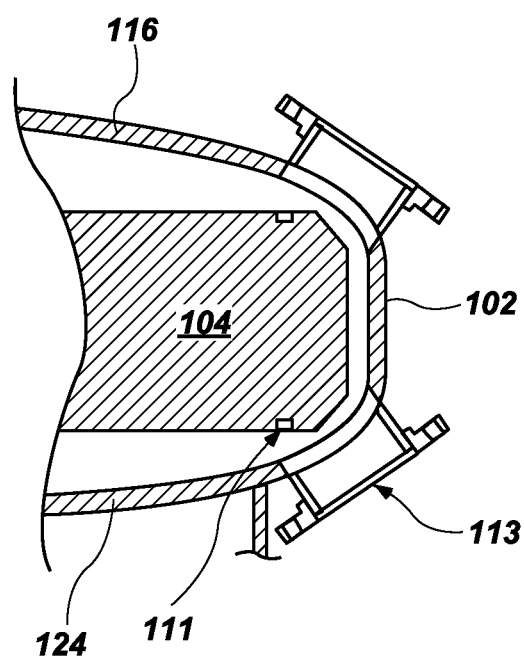
FIG. 2 is an partial view of a housing of the flywheel energy storage system of FIG. 1.

In some embodiments, the rotor 104 may comprise at least one groove 111 sized and configured to receive one or more weights to balance the rotor 104 for rotation with the housing 102. The groove 111 may extend annularly and proximate to the periphery of the rotor disc 106 in the upper surface 103 and/or the lower surface 105. The rotor 104 may be balanced after assembly of the rotor 104 with the journal assemblies 200a, 200b within the housing 102. Accordingly, as illustrated in the partial, cross-sectional view of the housing 102 in FIG. 2, the housing 102 may comprise one or more flanged openings 113 through which weights may be passed to be disposed within the grooves 111. The system 100 may further comprise at least one accelerometer coupled to and/or disposed about a periphery of bearings 136 (FIGS. 3 and 4) to measure a level of imbalance of the rotor 104. A tachometer or other device may also be operatively coupled to the rotor 104 and may be provided within the housing 102 to measure the rotational speed of the rotor 104. Accordingly, amplitudes of acceleration measured by the accelerometer provide information regarding a mass imbalance of the rotor disc 106 when the rotational speed of the rotor 104 is measured by the tachometer. A location of the mass imbalance may be determined such that a weight may be placed within the groove 111 to balance the rotor 104. Markings may be provided, such as angular degree markings, on the upper and lower surfaces 103, 105 of the rotor 104 to identify proper placement of the weights. By way of non-limiting example, degree markings in intervals of 5 degrees may be provided on the upper surface 103 and/or the lower surface 105 of the rotor 104. Balancing the rotor 104 reduces potential damage to the rotor 104 due to flywheel imbalances, such as rotor oscillation and vibration, and premature wear on the bearings 136 that may result from such imbalances. Overall, balancing the rotor 104 may extend the usable life of the flywheel system 100.

Figure 3:
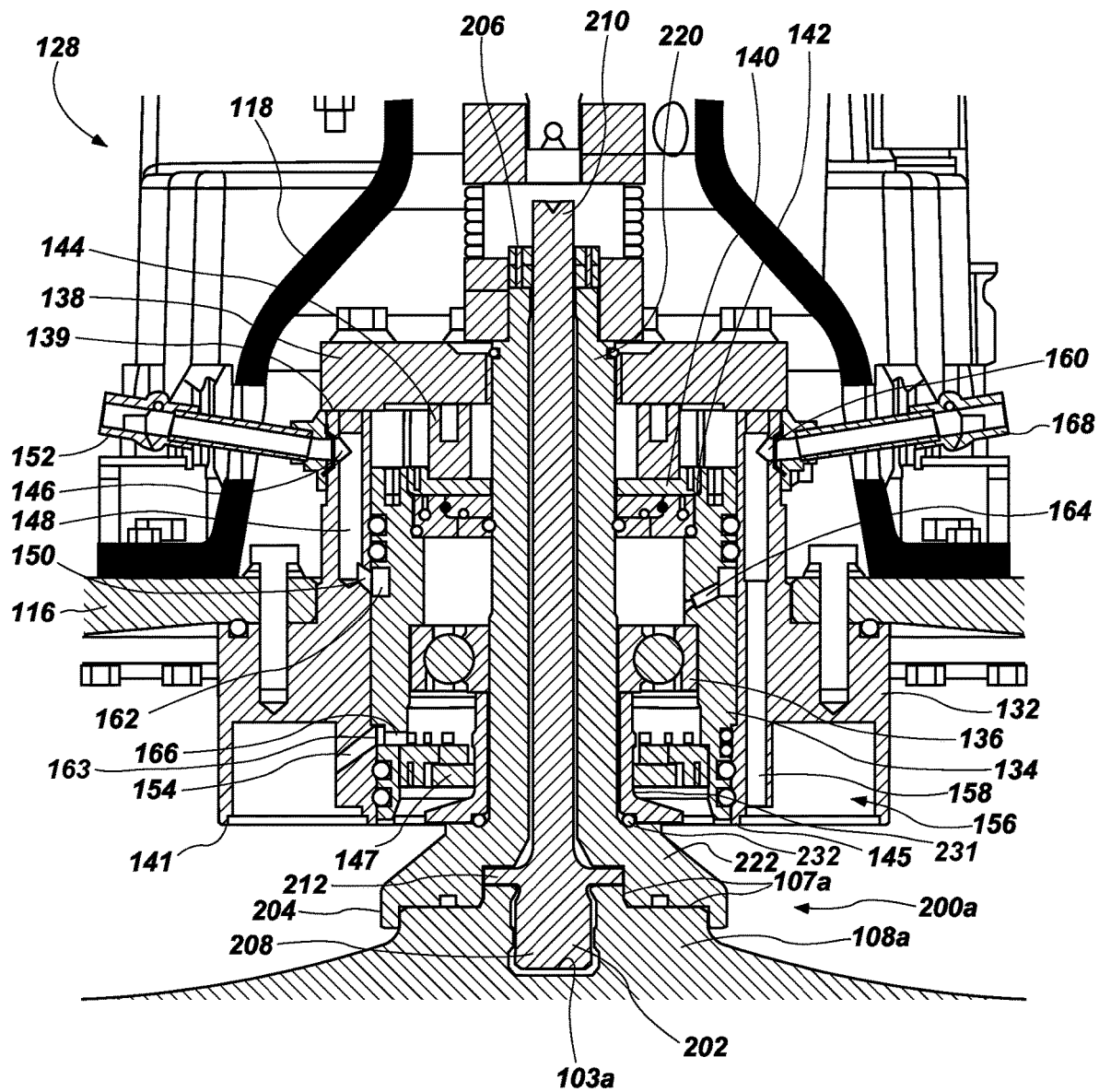
FIG. 3 is an enlarged cross-sectional view of an upper assembly illustrating connection between a flywheel rotor and a motor and/or generator of FIG. 1.
Figure 4:
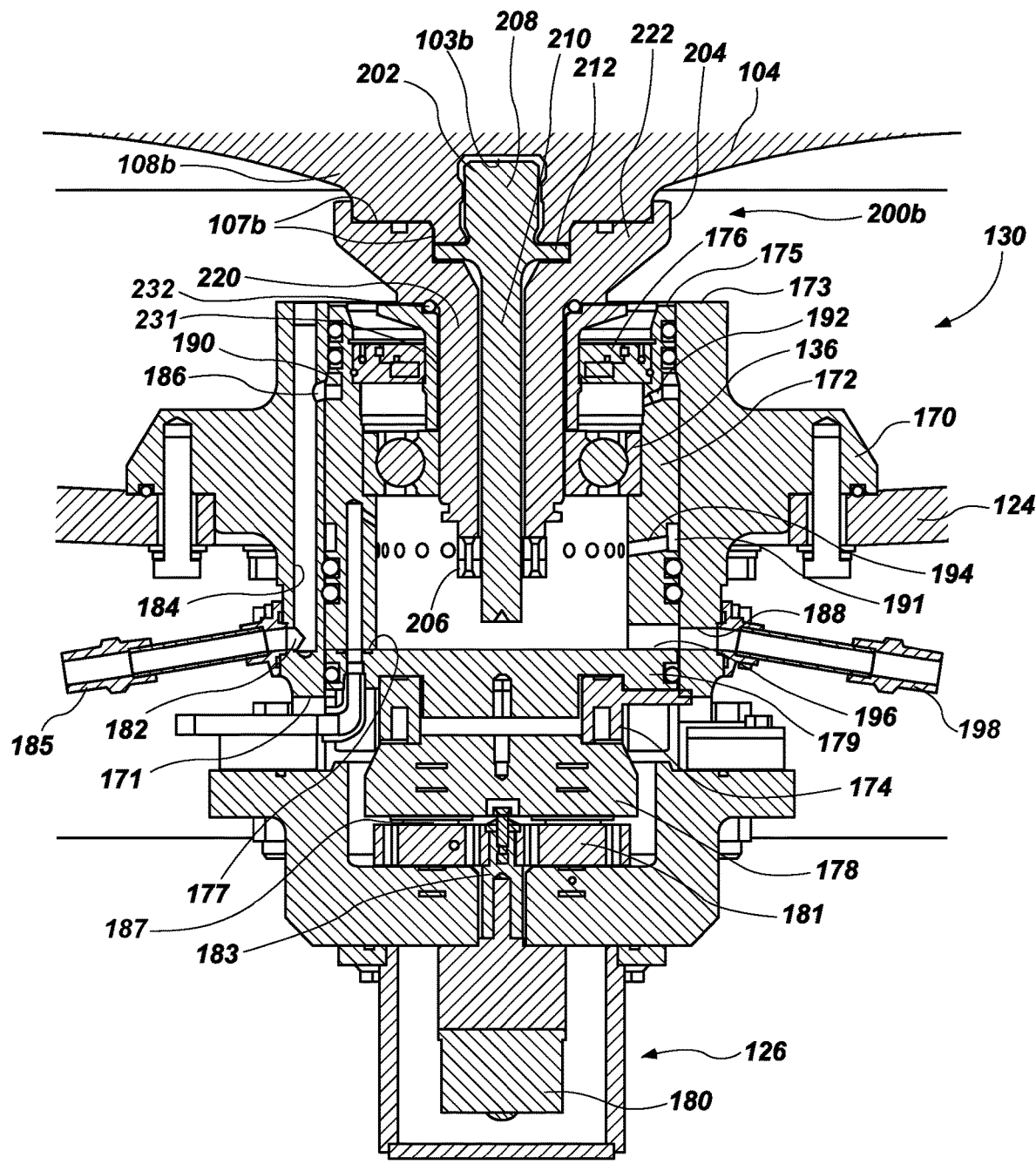
FIG. 4 is an enlarged cross-sectional view of a lower assembly illustrating connection between the flywheel rotor and a motor of FIG. 1.

FIGS. 3 and 4 are enlarged cross-sectional views of an upper bearing assembly 128 and a lower bearing assembly 130, respectively, of FIG. 1. The upper and lower bearing assemblies 128, 130 are operatively coupled to the rotor 104 at the respective upper and lower shafts 108a, 108b.

With continued reference to FIG. 3, the upper bearing assembly 128 comprises an outer housing 132 and an inner housing 134. The outer housing 132 extends about (e.g., encircles) the inner housing 134. The outer housing 132 may be stationary and may be fixed (e.g., coupled to) the upper housing member 116. The inner housing 134 may be axially translatable (e.g., movable) within the outer housing 132. One or more sealing elements may be provided about the inner housing 134 and between the inner housing 134 and the outer housing 132 to inhibit fluid from flowing into the housing 102 from the upper bearing assembly 128. One or more fastening elements, such as pins or dowels, may be provided between the inner housing 134 and the outer housing 132 to inhibit rotation of the inner housing 134 relative to the outer housing 132. Bearings 136 may be disposed within (e.g., encircled by) the inner housing 134 and about the upper journal assembly 200a.

The bearings 136 may comprise mechanical bearings such as ball bearings including a plurality of balls within a raceway. In some embodiments, the upper and lower bearing assemblies 128, 130 may each comprise a single ball bearing that includes a plurality of bearing elements (e.g., ball bearings) within a raceway. In other embodiments, the upper and lower bearing assemblies 128, 130 may each comprise two or more bearing assemblies stacked axially adjacent to each other. The bearings 136 may comprise angular contact bearings configured to support radial and axial loads during operation of the flywheel system 100.

A plate 138 may be disposed on a first, upper end 139 of the outer housing 132. A thrust plate 140 may disposed at a first, upper end 142 of the inner housing 134. A load cell 144 may be disposed axially between the plate 138 and the thrust plate 140. The thrust plate 140 may be axially translatable with the inner housing 134 and may apply a force against the load cell 144 when the rotor 104 is lifted during operation such that the load cell 144 is located and configured to measure a force applied on the bearings 136 in the upper bearing assembly 128 during operation of the system 100. A sealing plate 147 may be disposed on a second, lower end 145 of the inner housing 134. The sealing plate 147 is located and configured to provide a seal between a vacuum environment within the housing 102 and an atmospheric environment within the upper bearing assembly 128 and to seal fluid within the upper bearing assembly 128 such that the fluid does not flow into the housing 102.

A fluid circulation system may be coupled to at least one of the upper bearing assembly 128 and the lower bearing assembly 130. The fluid circulation system is configured to provide a fluid such as oil to the bearings 136 for lubrication and to provide fluid flow between the outer housing 132 and the inner housing 134 of the upper bearing assembly 128 (FIG. 3) and between an outer housing 170 and an inner housing 172 of the lower bearing assembly 130 (FIG. 4) for damping vibrations that may result from imbalance of the flywheel rotor 104 during operation of the flywheel system 100.

With reference to FIG. 3, the outer housing 132 and the inner housing 134 may comprise a plurality of openings (e.g., apertures, channels, etc.) through which fluid may be circulated in the upper bearing assembly 128. The outer housing 132 comprises a first aperture 146 located proximate to the first end 139 and extending from an exterior surface of the outer housing 132 to a first channel 148. The first channel 148 extends axially within the outer housing 132 between the first aperture 146 and a second aperture 150. The second aperture 150 is located between (e.g., intermediate) the first end 139 and a second, opposite end 141 of the outer housing 132. The first and second apertures 146, 150 are located at opposing ends of the first channel 148 such that the first aperture 146, the first channel 148, and the second aperture 150 are in fluid communication with a fluid inlet 152 through which fluid may be introduced into the upper bearing assembly 128.

The outer housing 132 comprises a plurality of third apertures 154 located proximate to the second end 141 and extending from the interior surface of the outer housing 132 to a sump 156. The third apertures 154 may be spaced circumferentially about the outer housing 132. The sump 156 comprises a cavity extending annularly within the outer housing 132. A second channel 158 extends axially within the outer housing 132 between the sump 156 and the first end 139. A fourth aperture 160 is located proximate to the first end 139 and extends from the second channel 158 to the exterior surface of the outer housing 132. The third apertures 154, the sump 156, the second channel 158, and the fourth aperture 160 may be in fluid communication such that fluid flowing into the sump 156 through the third apertures 154 may be removed by a scavenge pump, which may be coupled to the sump 156, from the sump 156 through the second channel 158, the fourth aperture 160, and a fluid outlet 168.

The inner housing 134 comprises a first groove 162 extending annularly about the exterior surface thereof and located proximate to the first end 142. A plurality of first apertures 164 extends through the inner housing 134 between the first groove 162 and an interior surface of the inner housing 134. The first apertures 164 may be circumferentially spaced about the inner housing 134. A plurality of second apertures 166 may be provided proximate to the second end 145 of the inner housing 134 and extend between the interior surface and the exterior surface of the inner housing 134. A second groove 163 extends annularly about the exterior surface thereof located proximate to the second end 141. The second groove 163 is in fluid communication with the second apertures 166. The inner housing 134 is located within the outer housing 132 such that the first groove 162 may be substantially aligned and in fluid communication with the second aperture 150 of the outer housing 132 and such that the second apertures 166 of the inner housing 134 are in fluid communication with the third apertures 154 of the outer housing 132.

In operation, fluid may be provided to the bearings 136 for lubrication by introducing fluid into the fluid inlet 152, through the first aperture 146, the first channel 148, and the second aperture 150 of the outer housing 132, and radially inward from the second aperture 150 to the first groove 162 and the first apertures 164 of the inner housing 134. The first apertures 164 are located axially above the bearings 136 such that fluid flows into the bearings 136 and through the bearings 136 to impinge against the sealing plate 147. Fluid is diverted radially outward on the sealing plate 147 to the second apertures 166, through the third apertures 154, and into the sump 156.

Further, the inner housing 134 and the outer housing 132 are sized and configured to provide fluid flow therebetween. A portion of the inner housing 134 and the outer housing 132 encircling the bearings 136 may be sized and configured such that a fluid may flow in an annular space between the inner housing 134 and the outer housing 132 and form a fluid film of a squeeze film damper. The annular space may extend radially between the inner housing 134 and the outer housing 132 and axially between the first groove 162 and the second groove 163 of the inner housing 134. In operation, fluid may be introduced into the fluid inlet 152, through the first aperture 146, the first channel 148, and the second aperture 150 of the outer housing 132, from the second aperture 150 to the first groove 162, axially from the first groove 162 to the second groove 163, and into the sump 156 through the third apertures 154 of the outer housing 132. In some embodiments, a diameter of the first apertures 164 may be selected to restrict (e.g., constrict) a rate of fluid flow through therethrough and to build up fluid pressure upstream from the first apertures 164, such as within the first groove 162 and the first channel 148. In other embodiments, a fluid flow limiting device, such as a nozzle, may be provided within the first apertures 164 to constrict fluid flow therethrough and to build up fluid pressure upstream from the first apertures 164. The diameter of the first apertures 164 and/or the fluid flow limiting device is selected such that the rate at which fluid is provided (e.g., flow rate) through the fluid inlet 152 is greater than the rate at which the fluid is provided through the first apertures 164 and into the bearings 136.

Squeeze film damping occurs when force associated with radial and/or axial vibration is transmitted from an upper journal assembly 200a to the bearings 136 and to the fluid film between the housings 132, 134. The fluid film exerts an opposing force to any radial and/or axial vibration in order inhibit (e.g., dampen or attenuate) vibrations. In addition, the fluid film provides a radial force on the bearings 136 and the journal assembly 200a to radially center rotation of the journal assembly 200a. Accordingly, a common fluid circulation system is provided to lubricate the bearings 136 and to dampen vibrations during operation of the flywheel system 100 reducing premature wear of bearings 136. Inhibiting deviations of the axis 112 about which the rotor 104 rotates and damping vibrations results in an increased usable life of the flywheel system 100. The fluid (e.g., oil) selected to flow through the upper bearing assembly 128 is selected to have a viscosity extending in a range from about 5 centistokes (cSt) to about 50 cSt as the fluid flows within the bearings 136 and a viscosity extending in a range from about 5 cSt to about 30 cSt as the fluid flows between the housings 132, 134.

With reference to FIG. 4, similar to the upper bearing assembly 128, the lower bearing assembly 130 comprises the outer housing 170 extending about the inner housing 172. The outer housing 170 may be stationary and fixed to the lower housing member 124. The inner housing 172 may be axially translatable within the outer housing 170. One or more sealing elements may be provided about the inner housing 172 and between the inner housing 172 and the outer housing 170 to inhibit fluid from flowing into the housing 102 from the lower bearing assembly 130. One or more fastening elements may be provided between the inner housing 172 and the outer housing 170 to inhibit rotation of the inner housing 172 relative to the outer housing 170. Bearings 136 may be disposed within the inner housing 172 and about the lower journal assembly 200b.

A first sealing plate 176 may be disposed on a first, upper end 175 of the inner housing 172, and a second sealing plate 179 may be disposed on a second, lower end 177 of the inner housing 172. The first sealing plate 176 is located and configured to seal the vacuum environment within the housing 102 from an atmospheric environment within the lower bearing assembly 130. The second sealing plate 179 is located and configured to seal fluid within the lower bearing assembly 130 such that fluid does not flow into the gear drive system 126. The gear drive system 126 may be disposed adjacent to the second end 177 of the inner housing 172. The gear drive system 126 comprises a stepper motor 180 that is coupled to a center pinion 183. The center pinion 183 is threadedly engaged with gears 181. One or more shafts 187 may be extend between and be engaged with the gears 181 and the thrust plate 178. A load cell 174 may be located between the second sealing plate 179 and the thrust plate 178. The load cell 174 is located and configured to measure a force applied on the bearings 136 in the lower bearing assembly 130 during operation of the system 100. The gear drive system 126 may be configured to adjust a load applied to bearings 136. The stepper motor 180 may rotate the center pinion 183 such that rotation of the center pinion 183 rotates the gears 181. Rotation of the gears 181 axially raises or lowers the shafts 187 engaged therewith, and the shafts 187 raise or lower the thrust plate 178 accordingly. Raising the thrust plate 178 may apply an axially upward force to the load cell 174 of the lower bearing assembly 130.

The fluid circulation system may be further coupled to the lower bearing assembly 130. The outer housing 170 and the inner housing 172 may comprise a plurality of openings through which fluid may be circulated in the lower bearing assembly 130. The outer housing 170 comprises a first aperture 182 located proximate to a first, lower end 171 and extending from an exterior surface of the outer housing 170 to a first channel 184. The first channel 184 extends axially within the outer housing 170 between the first aperture 182 and a second aperture 186. The second aperture 186 is located proximate to a second, upper end 173 of the outer housing 170. The first and second apertures 182, 186 are located at opposing ends of the first channel 184 such that the first aperture 182, the first channel 184, and the second aperture 186 are in fluid communication with a fluid inlet 185 through which fluid may be introduced into the lower bearing assembly 130. A third aperture 188 is located proximate to the first end 171 and extends from the interior surface to the exterior surface of the outer housing 170.

The inner housing 172 comprises a first groove 190 extending annularly about the exterior surface and located proximate to the first end 175. A plurality of first apertures 192 extends through the inner housing 172 between the first groove 190 and an interior surface. A second groove 191 extends annularly about the exterior surface of the inner housing 172 and is located between the first end 175 and the second end 177 of the inner housing 172. The second groove 191 is in fluid communication with a plurality of second apertures 194. The second apertures 194 extend through the inner housing 172 between the second groove 191 and the interior surface. The first and second apertures 192, 194 may be spaced circumferentially about the inner housing 172. A third aperture 196 may be provided that extends through the inner housing 172 adjacent the second end 177 thereof. The inner housing 172 is located in the outer housing 170 such that the first groove 190 is in fluid communication with the second aperture 186 of the outer housing 170 and such that the third aperture 196 of the inner housing 172 is in fluid communication with the third aperture 186 188 of the outer housing 170.

In operation, fluid may be provided to the bearings 136 for lubrication thereof by introducing fluid into the fluid inlet 185 and through the first aperture 182, the first channel 184, and the second aperture 186 of the outer housing 170 and through the second aperture 194, the first groove 190, and the first apertures 192 of the inner housing 172. The inner housing 172 and the outer housing 170 may be located such that the first apertures 192 are located axially above the bearings 136 to provide fluid flow into the bearings 136 and through the bearings 136 to impinge against the second sealing plate 179. Fluid is diverted radially outward on the second sealing plate 179 to the third aperture 196 of the inner housing 172, to the third aperture 188 of the outer housing 170, and to a fluid outlet 198.

The inner housing 172 and the outer housing 170 are further sized and configured to provide fluid flow therebetween to form a squeeze film damper about the bearings 136 of the lower bearing assembly 130 as previously discussed with respect to the upper bearing assembly 128. A portion of the inner housing 172 and the outer housing 170 encircling the bearings 136 may be sized and configured such that an annular space for fluid flow is provided therebetween. The annular space may be provided radially between the inner housing 172 and the outer housing 170 and axially between the first groove 190 and the second groove 191 of the inner housing 172. Accordingly, fluid may be introduced into the fluid inlet 185, through the first aperture 182, the first channel 184, and the second aperture 186 of the outer housing 170, from the second aperture 186 to the first groove 190, axially from the first groove 190 to the second groove 191, through the second apertures 194 radially inward through the inner housing 172, impinging against the second sealing plate 179, and radially outward through the third aperture 196, the third aperture 188, and the fluid outlet 198. As previously described with reference to the first apertures 164, the first apertures 192 may be selected to have a diameter and/or may include a fluid flow limiting device that restricts fluid flow therethrough and into the bearings 136 and to build up fluid pressure upstream from the first apertures 192, such as in the first groove 190 and/or the first channel 184.

Figure 5:
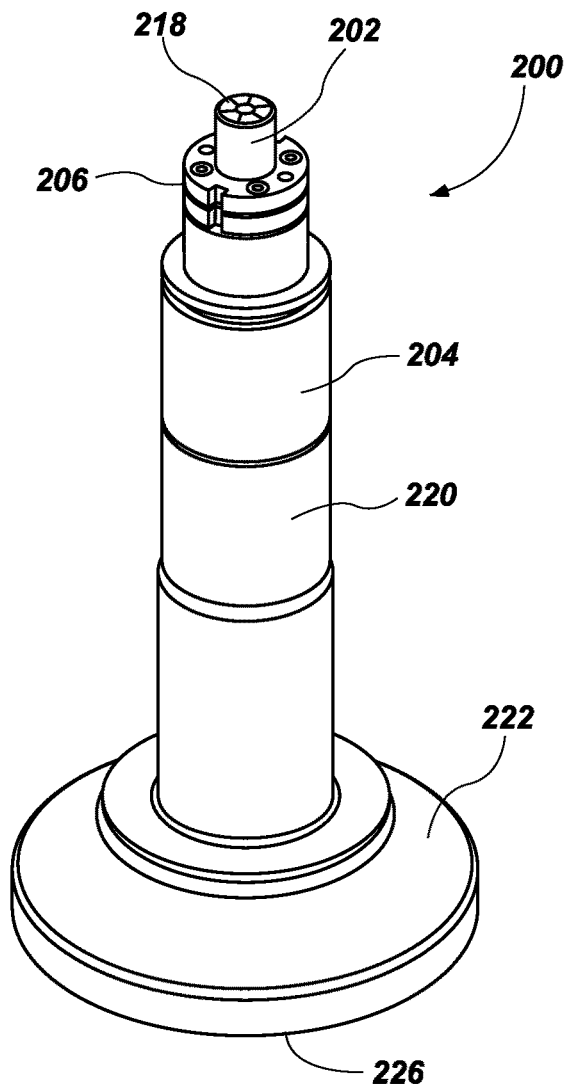
FIG. 5 is a perspective view of a journal assembly of FIG. 1.
Figure 6:
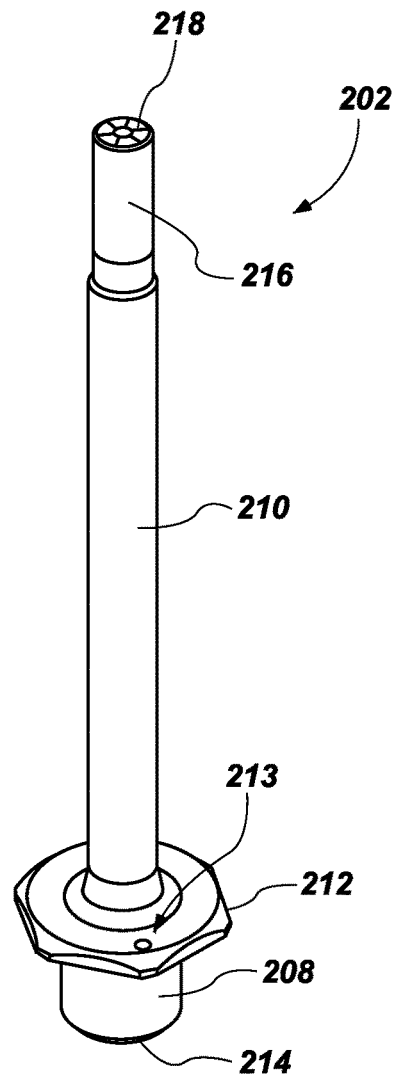
FIG. 6 is a perspective view of a rod of the journal assembly of FIG. 5.
Figure 7:
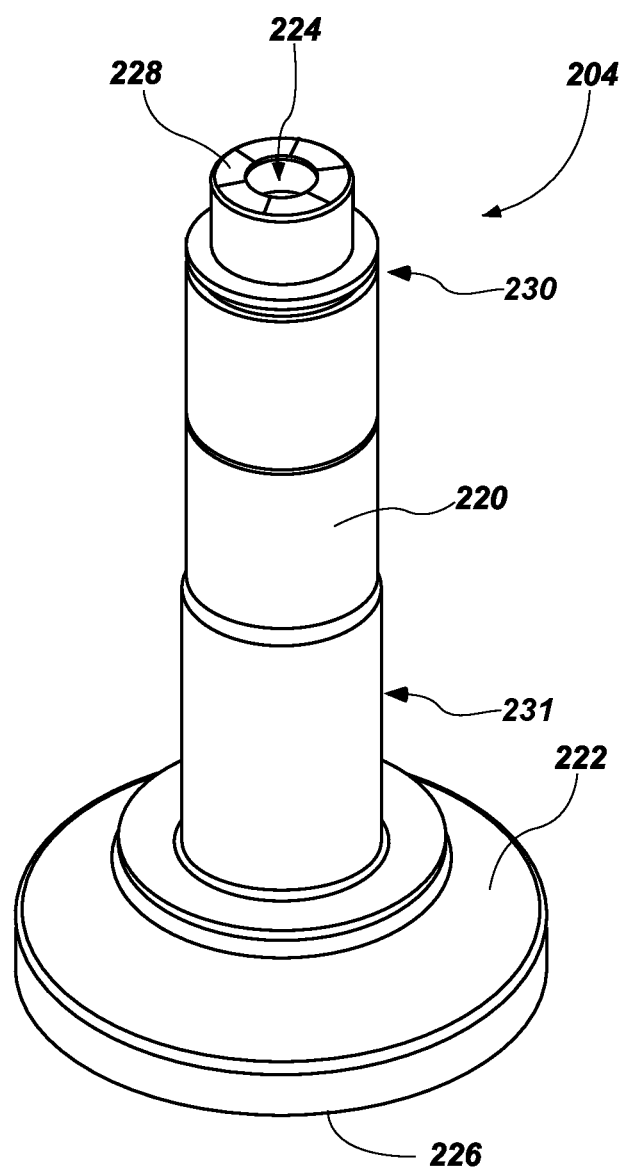
FIG. 7 is a perspective view of a sleeve of the journal assembly of FIG. 5.

With reference to each of FIGS. 3 and 4, the upper bearing assembly 128 and the lower bearing assembly 130 surround (e.g., encircle) at least a portion of the upper journal assembly 200a and the lower rotating assembly 200b, respectively. The upper and lower rotating journal assemblies 200a, 200b are separable from and coupled to the rotor 104. FIG. 5 is a perspective view of a journal assembly 200 for use in the upper and lower bearing assemblies 128, 130. FIGS. 6 and 7 respectively illustrate a perspective view of a rod 202 and a sleeve 204, respectively, of the journal assembly 200 when the journal assembly 200 is disassembled. The upper and lower journal assemblies 200a, 200b may be provided for rotation with the flywheel rotor 104 and rotates within the upper and lower bearing assemblies 128, 130.

With continued reference to FIGS. 5 through 7, each journal assembly 200 may comprise a rod 202, a sleeve 204, and a retaining element 206. As best illustrated in FIG. 6, the rod 202 may comprise a monolithic unit including a head 208, an elongated shaft 210, and an annular flange 212 between the head 208 and the elongated shaft 210. The head 208 may be located at a first end 214 of the rod 202, and one or more connecting features 216 (e.g., threading) may be located proximate to a second, opposite end 218 of the rod 202. The connecting features 216 may be provided to couple the rod 202 and the retaining element 206. The retaining element 206 may be a nut and/or may comprise corresponding threading or other connecting features.

The flange 212 extends radially beyond an outer surface of the elongated shaft 210 and the head 208. In some embodiments, and as best illustrated in FIG. 6, a perimeter of the flange 212 may be polygonal in shape. For example, the flange 212 may be hexagonal in shape. A perimeter of at least one of the protruding features 107a, 107b of the shafts 108a, 108b may also a polygonal shape and may have a corresponding number of sides as the polygon shape of the flange 212. In some embodiments, the flange 212 may comprise at least one aperture 213 extending therethrough, and the shafts 108a, 108b may include a plurality of recesses therein. During assembly of the journal assembly 200 with the rotor 104, the apertures 213 of the flange 212 may be aligned with recesses in the shafts 108a, 108b to properly orient (e.g., align) the sides of the polygonal shape of the flange 212 and the protruding features 107a, 107b. A mechanical fastener may be provided in the apertures 213 of the flange 212 and the recesses of the protruding features 107a, 107b to assist in alignment of the rod 202 to the rotor 104.

As best illustrated in FIG. 7, the sleeve 204 may comprise a monolithic unit including an elongated (e.g., axially extending) shaft 220 and an enlarged head 222 extending axially and radially from the shaft 220. The sleeve 204 may further comprise an aperture 224 extending axially therethrough from a first end 226 to a second, opposite end 228. The aperture 224 of the sleeve 204 is sized and configured to receive at least a portion of the rod 202 therein. The sleeve 204 includes one or more connecting elements 230 located proximate to the second end 228. Such connecting elements 230 may be provided to operatively couple the sleeve 204 of the upper journal assembly 200a to the motor/generator assembly 124.

A portion of the aperture 224 within the head 222 of the sleeve 204 may be complementary in shape to the protruding features 107a, 107b of the rotor shaft 108. Accordingly, an interior surface of the sleeve 204 defining a portion of the aperture 224 within the head 222 may be polygonal in shape corresponding to the polygonal shape of the flange 212 and the protruding features 107a, 107b. The corresponding shapes of the flange 212, the aperture 224, and the protruding features 107a, 107b inhibits rotation of the rod 202, the sleeve 204, and the rotor 104 relative to each other during operation of the flywheel system 100.

When the rod 202 and the sleeve 204 of the upper and lower journal assemblies 200a, 200b are assembled, as best illustrated in FIGS. 3 through 5, the elongated shaft 210 extends through the aperture 224 of the sleeve 204. As assembled, a longitudinal axis extending centrally through the aperture 224 of the sleeve 204 between the first and second ends 226, 228 thereof and a longitudinal axis extending centrally through the rod 202 between the first and second ends 214, 218 may be coaxial. A substantial portion (e.g., majority) of the shaft 210 of the rod 202 may be retained within and encircled by the shaft 220 of the sleeve 204. The rod 202 may have a length greater than the sleeve 204. Accordingly, the rod 202 may be disposed within the sleeve 204 such that at least a portion of the shaft 210 may extend axially beyond the second end 228 of the sleeve 204 when the rod 202 is disposed therein and such that the connecting elements 216 are accessible and not surrounded by the shaft 220. A sliding clearance fit may be provided between the shaft 210 of the rod 202 and the shaft 220 of the sleeve 204 within the aperture 224 along a majority of the length of the shafts 210, 220. A slip fit may be provided between the shaft 210 of the rod 202 and the shaft 220 of the sleeve 204 at the second ends 218, 228 of the shafts 210, 220 adjacent to which the retaining element 206 is provided. Providing the rod 202 having a length greater than the length of the sleeve 204 inhibits deflection of the rod 202 within the sleeve 204, such as tilting of the longitudinal axis of the rod 202 relative to the longitudinal axis of the sleeve 204 and/or the rotational axis 112 of the rotor 104, and prevent the generation of a bending stress within the rod 202 during operation of the system 100.

When assembled with the sleeve 204, the rod 202 may be held in tension and, accordingly, may be referred to as a "tension rod." In some embodiments, the tensioning force is applied to the rod 202 when the rod 202 is disposed within the sleeve 204. A tensioning force may be applied to the rod 202 by mechanically pulling axially on the second end 218 of the rod 202. A compressive force may be applied to the sleeve 204 while the tensioning force is applied to the rod 202. The first end 214 of the rod 202 may be disposed in the recesses 103a, 103b of the rotor shaft 108 while the tensioning force is applied to the second end 218 of the rod 202. The tensioning force may be applied until a tension force measured in the rod 202 is in a range extending from about 10,000 lbf to about 20,000 lbf such as about 12,000 lbf. When the desired tension force is measured in the rod 202, the compressive force on the sleeve 204 is released, and the retaining element 206 may be coupled to the rod 202. The retaining element 206 maintains the tension force within the rod 202 during operation of the flywheel system 100. The tension force within the rod 202 may inhibit tilting of the rod 202 relative to the sleeve 204 such that the rod 202 and the sleeve 204 are maintained in a coaxial arrangement during operation of the system 100. The tension force in the rod 202 may also increase the rigidity of the journal assemblies 200a, 200b and further inhibit wobbling (e.g., tilting) of the journal assemblies 200a, 200b relative to the rotor 104.

When the journal assemblies 200a, 200b are assembled with the rotor 104, as best illustrated in FIGS. 3 and 4, the rod 202 may be coupled (e.g., fastened) to the rotor 104. In some embodiments, the upper and lower shafts 108a, 108b include respective upper and lower recesses 103a, 103b formed therein for coupling the rod 202 to the rotor 104. The recesses 103a, 103b are sized and configured to receive the head 208 of a rod 202 of the journal assemblies 200a, 200b, respectively, therein. More particularly, the recesses 103a, 103b are sized and configured to retain the head 208 of the rod 202 therein by mechanical interference, or an interference fit and, more particularly, by a press fit. Alternatively or additionally, inner surfaces of the shafts 108a, 108b within the recesses 103a, 103b may comprise with one or more coupling features such as threading thereon, and an outer surface of the head 208 of the rod 202 may comprise corresponding coupling features such that the head 208 of the rod 202 may be retained in the rotor shafts 108a, 108b. The bearings 136 may be retained about the sleeve 204 by a threadless connection such as by press fit.

As further illustrated in FIGS. 3 and 4, the sleeve 204 may be coupled to the rotor 104. When the sleeve 204 is assembled with the rotor 104, at least a portion of the head 222 of the sleeve 204 may extend about (e.g., encircle) the protruding features 107a, 107b of the shafts 108a, 108b. The protruding features 107a, 107b of the shafts 108a, 108b and the flange 212 of the rod 202 may be disposed within a portion of the aperture 224 within the head 222 of the sleeve 204. Accordingly, the flange 212 may be disposed axially between the sleeve 204 and the rotor 104. The aperture 224 is sized and configured such that the head 222 of the sleeve 204 may be coupled to the shafts 108a, 108b by mechanical interference (e.g., an interference fit), such as a press fit. Interference fit between the sleeve 204 and the rod 202 inhibits wobbling of the sleeve 204 and the rod 202 relative to each other and relative to the rotor 104 and maintains the sleeve 204 and the rod 202 such that the sleeve 204 and the rod 202 are arranged coaxially. The head 222 of the sleeve 204 may be disposed circumferentially about the protruding features 107a, 107b and the head 222 applies a radially compressive force on the protruding features 107a, 107b. The radially compressive force couples the sleeve 204 to the rotor 104, inhibits rotation of the sleeve 204 relative to the rotor 104, and/or inhibits wobbling (e.g., inclining of the rotor 104 along an axis transverse to the axis 112) of the rotor 104 relative to the journal assemblies 200a, 200b during operation of the flywheel system 100. The radially compressive force is selected to limit inclining of the sleeve 204 relative to the rotor 104 to about 0.000001 inch. The radially compressive force may be selected to extend in a range from about 500 lbf to about 1500 lbf, such as about 1025 lbf. As assembled, the longitudinal axes of the sleeve 204 and the rod 202 and the axis 112 of the rotor 104 may be coaxial.

With continued reference to FIGS. 3 and 4, a seal runner 231 may be provided about the sleeve 204 and may be configured to inhibit axial movement of the bearings 136 along the sleeve 204. The seal runner 231 may be disposed axially between the bearings 136 and the head 222 of the sleeve 204. The seal runner 231 may be disposed radially between the sleeve 204 and the respective sealing plates 147, 179 of the upper and lower bearing assemblies 128, 130. The seal runner 231 may be retained about the sleeve 204 by a threadless connection such as by a press fit. A seal 232 may be provided about the sleeve 204 and compressed between the seal runner 231 and the shaft 220. The seal 232 may comprise an o-ring, washer, or other element configured to inhibit (e.g., prevent) fluid flow from the bearings 136 from flowing between the seal runner 231 and the sleeve 204 and into the housing 102.

In operation, the motor/generator 124 is coupled to the rotor 104 by the upper journal assembly 200a and is configured to convert electrical energy into rotational kinetic energy by inputting energy into the system 100 to spin (e.g., rotate) the rotor 104 and/or to convert rotational kinetic energy of the rotor 104 into electrical energy. Accordingly, energy can be stored in and/or drawn from the rotor 104. To rotate the rotor 104, the rotor 104 may be lifted using the off-loading magnet 114. When the rotor 104 is at least, the weight of the rotor 104 is supported by the bearings 136 of the lower bearing assembly 130. In some embodiments, a current is provided to the off-loading magnet 114 to generate a magnetic force that is applied to the rotor 104 to provide an axial lifting force (e.g., in a direction parallel to the axis 112 of the rotor 104) on the rotor 104 toward the upper housing member 116.

Initially, a current is applied to the off-loading magnet 114 sufficient to levitate the rotor 104 within the housing 102 such that substantially no axial force (e.g., force measured in a direct parallel to the axis 112) is applied by the rotor 104 on the bearings 136. While levitating the rotor 104 within the housing 102 throughout the flywheel operation may maximize the efficiency of the flywheel system 100 by reducing friction losses in the system 100, a force may be applied by the rotor 104 on the bearings 136 to inhibit balls in the bearings 136 from skidding is not feasible throughout operation. Accordingly, the current applied to the off-loading magnet 114 may be adjusted during operation of the rotor 104 to maintain a pre-determined load on the bearings 136 in the upper bearing assembly 128. Additionally, the gear drive system 126 coupled to the lower bearing assembly 130 may be adjusted during operation of the rotor 104 to maintain a pre-determined load on the bearings 136 in the lower bearing assembly 130. In some embodiments, the pre-determined force applied to the bearings 136 of the upper and lower bearing assemblies 128, 130 and measured by the load cells 144, 174 is selected to be substantially equal. In other embodiments, a differential force may be applied to the bearings of the upper and lower bearing assemblies 128, 130. For example, a load in a range extending from about 100 lbs and about 500 lbs or about 300 lbs may be applied to each of the bearings 136 and measured by the respective load cells 144, 174.

A load may be applied to the bearing 136 and measured by the load cell 144 in the upper bearing assembly 128 by axially translating the rotor 104 with the off-loading magnet 114 and by compressing one or more components of the upper journal assembly 200a and the upper bearing assembly 128 between the rotor 104 and the plate 138 of the outer housing 132. As the rotor 104 is lifted, the seal runner 231, the bearing 136, the inner housing 134, the thrust plate 140, and the load cell 144 are lifted correspondingly with the upper journal assembly 200a that is coupled to the rotor 104. As the components of the upper bearing assembly 128 are axially translated within the stationary outer housing 132, the load cell 144 is compressed between the thrust plate 140 and the plate 138. When the load cell 144 is compressed and a load is measured by the load cell 144, a compressive force may be applied on and between axially adjacent components of the upper bearing assembly 128. Accordingly, the rotor 104 may apply a compressive force on the sleeve 204, the sleeve 204 may apply a compressive force on the seal runner 231, the seal runner 231 may apply a compressive force on the raceway of the bearing 136, the raceway of the bearing 136 may apply a compressive force on the inner housing 134, the thrust plate 140 may apply a compressive force on the load cell 144, and the load cell 144 may apply a compressive force on the plate 138. Each of the foregoing compressive forces may be applied in the axial direction parallel to the central axis 112.

A load may be applied to the bearing 136 and measured by the load cell 174 in the lower bearing assembly 130 by axially translating the thrust plate 178 of the gear drive system 126 and by compressing one or more components of the lower journal assembly 200a and the lower bearing assembly 130 between the rotor 104 and the thrust plate 178 fixed to the gear drive system 126. In the gear drive system 126, the stepper motor 180 may rotate the center pinion 183 such that the gears 181 are rotated. Rotation of the gears 181 is converted into axial movement of the shafts 187 operatively coupled to the gears 181. Axial movement of the shafts 187 raises or lowers the thrust plate 178 along the central axis 112. As the thrust plate 178 is lifted, the lower journal assembly 200b and one or more components of the lower bearing assembly 130 are lifted correspondingly. As the thrust plate 178 is lifted, the load cell 174, the first sealing plate 176, the inner housing 172, the bearings 136, the seal runner 231, and the sleeve 204 are lifted correspondingly and are axially translated within the stationary outer housing 170 such the load cell 174 is compressed between the thrust plate 178 and the second sealing plate 179. When the load cell 174 is compressed and a load is measured by the load cell 174, a compressive force may be applied on and between axially adjacent components of the lower bearing assembly 130. In such embodiments, the second sealing plate 179 may apply a compressive force on the inner housing 172, the inner housing 172 may apply a compressive force on the race way of the bearing 136, the raceway of the bearing 136 may apply a compressive force on the seal runner, 230, the seal runner 231 may apply a compressive force on the sleeve 204, and the sleeve 204 may apply a compressive force on the rotor 104. Each of the foregoing compressive forces may be applied in the axial direction parallel to the central axis 112.

In some embodiments, the gear drive system 126 and the off-loading magnet 114 are coupled to at least one controller that monitors (e.g., measures) a load measured by the load cells 144, 174 and, based on the load measured, may adjust the current applied to the off-loading magnet 114 and/or the axial position of the thrust plate 178 such that a predetermined load is applied to the load cells 144, 174. In some embodiments, the gear drive system 126 and the off-loading magnet 114 may be coupled to separate controllers. The gear drive system 126 and the off-loading magnet 114 may be separately adjustable. The controller may employ a feedback control loop, such as a proportional-integral-derivative (PID) control loop. The PID control loops accounts for a current state of the flywheel system 100 (e.g., current load on load cells 144, 174) in relation to a desired setpoint, or the predetermined load (proportional), the accumulation of past error in the flywheel system 100 (integral) and a prediction of future error of the flywheel system (derivative) to adjust or to maintain a current applied to the off-loading magnet 114 and/or to adjust or to maintain a position of the thrust plate 178.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors.

What is claimed is:

1. A flywheel system, comprising:
a flywheel rotor comprising a rotor disc and a rotor shaft, a longitudinal axis of the flywheel rotor extending centrally through the rotor disc and the rotor shaft;
a journal assembly configured to facilitate rotation of the flywheel rotor, the journal assembly comprising:
a sleeve having an aperture extending therethrough from a first end to an opposite second end, the second end of the sleeve coupled to the rotor shaft, a longitudinal axis of the sleeve extending therethrough from the first end to the second end;
a rod at least partially disposed within the aperture of the sleeve, a first end of the rod extending axially beyond the first end of the sleeve and a second end of the rod coupled to the rotor shaft, a longitudinal axis of the rod extending therethrough from the first end to the second end wherein the longitudinal axes of the sleeve and the rod are coaxial with the longitudinal axis of the flywheel rotor and the rod is tensioned to a force of 12,000 lbf or more; and
a retaining element coupled to the first end of the rod extending axially beyond the first end of the sleeve.

2. The flywheel system of claim 1, wherein the tension force is retained within the rod by the retaining element.

3. The flywheel system of claim 1, wherein the rod comprises an elongated shaft at the first end, a head at the second end, and a flange between the elongated shaft and the head.

4. The flywheel system of claim 3, wherein the rotor shaft comprises a recess formed therein, the recess sized and configured to retain the head of the rod therein by mechanical interference.

5. The flywheel system of claim 3, wherein the sleeve comprises an elongated shaft at the first end and a head at the second end, and wherein a portion of the aperture extending through the head of the sleeve is sized and configured to retain the sleeve about the rotor shaft by mechanical interference.

6. The flywheel system of claim 1, further comprising a bearing assembly encircling the journal assembly, the bearing assembly comprising bearings disposed between an inner housing and an outer housing.

7. The flywheel system of claim 6, wherein an annular space extends radially between the inner housing and the outer housing about the bearings, the annular space sized and configured for formation of a squeeze film damper about the bearings.

8. The flywheel system of claim 6, wherein the inner housing is axially translatable relative to the outer housing.

9. The flywheel system of claim 6, wherein the inner housing is rotationally fixed relative to the outer housing.

10. A method of using a flywheel system, comprising:
rotating a flywheel rotor disposed between an upper journal assembly and a lower journal assembly, wherein each of the upper journal assembly and the lower journal assembly is coupled to the flywheel rotor and comprises:
a sleeve having an aperture extending therethrough from a first end to an opposite second end;
a rod disposed within the aperture of the sleeve such that a portion the rod extends axially beyond the first end of the sleeve; and
a retaining element coupled to the portion of the rod extending axially beyond the first end of the sleeve; and
lifting the flywheel rotor axially toward an upper bearing assembly and away from a lower bearing assembly to apply an axially compressive force against a bearing disposed within the upper bearing assembly, the upper bearing assembly disposed about the upper journal assembly.

11. The method of claim 10, wherein the upper bearing assembly comprises:
an inner housing;
a first plate disposed on an upper surface of the inner housing;
an outer housing encircling the inner housing;
a second plate disposed on an upper surface of the outer housing; and
a load cell disposed between the first plate and the second plate.

12. The method of claim 11, wherein lifting the flywheel rotor axially toward the upper bearing assembly comprises axially translating the inner housing within the outer housing such that the load cell is compressed between the first plate and the second plate.

13. The method of claim 11, further comprising flowing a fluid into the upper bearing assembly through a plurality of openings formed in the inner housing and/or the outer housing into an area occupied by the bearing.

14. The method of claim 13, wherein the area occupied by the bearing comprises an annular space located between the inner housing and the outer housing.

15. The method of claim 14, further comprising forming a squeeze film damper in the area occupied by the bearing using the flowing fluid.

16. A method of forming a flywheel system comprising:
coupling a first end of a rod to a flywheel rotor shaft, the rod having a first end and an opposite second end, the first end of the rod coupled to the flywheel rotor shaft;
disposing a sleeve about the rod and coupling the sleeve to the flywheel rotor shaft, the sleeve having a first end and an opposite second end, the first end of the sleeve coupled to the flywheel rotor shaft, an opposite second end of the rod extending axially beyond the second end of the sleeve;
pulling the second end of the rod to tension the rod; and
coupling a retaining element to the second end of the rod to maintain the tension in the rod.

17. The method of claim 16, further comprising applying a compressive force on the sleeve while pulling the second end of the rod.

18. The method of claim 16, wherein coupling the first end of the rod to the flywheel rotor shaft comprises disposing the first end of the rod in a recess formed in the flywheel rotor shaft, the first end of the rod coupled to the flywheel rotor shaft by mechanical interference.

19. The method of claim 16, wherein coupling the first end of the sleeve to the flywheel rotor shaft comprises disposing a portion of the sleeve circumferentially about the flywheel rotor shaft, the first end of the sleeve coupled to the flywheel rotor shaft by mechanical interference.

* * * * *